Dec. 12, 1933.   W. A. EATON ET AL   1,938,745
STEERING MECHANISM
Original Filed May 3, 1932
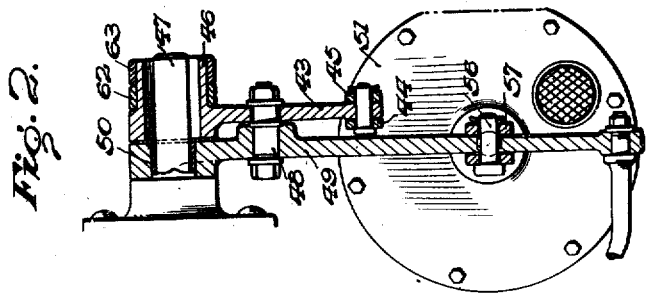
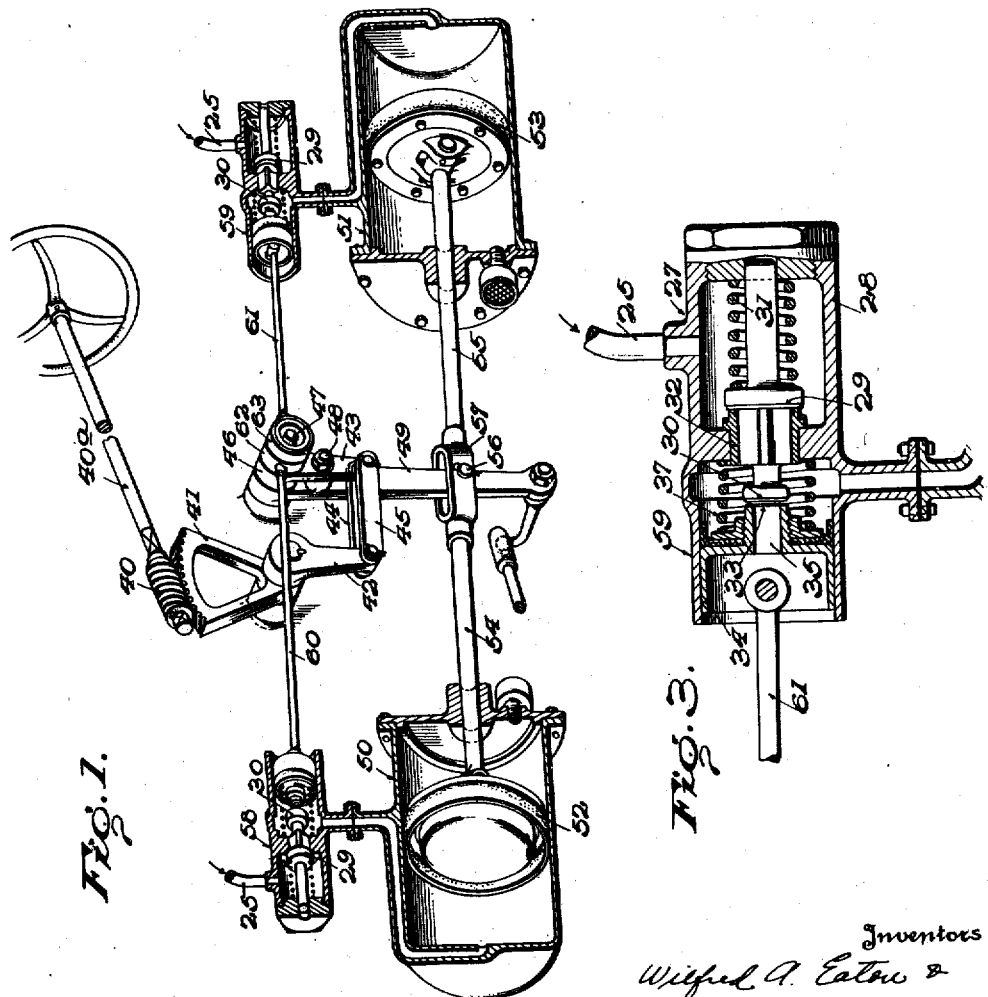
Inventors
Wilfred A. Eaton &
Stephen Vorech
By N. W. Parker Jr.
Attorney Patented Dec.

1,938,745

UNITED STATES PATENT OFFICE 1,938,745

STEERING MECHANISM

Wilfred A. Eaton and Stephen Vorech, Pittsburgh, Pa., assignors to Bendix-Westinghouse Automotive Air Brake Company, Pittsburgh, Pa., a corporation of Delaware Original application May 3, 1932, Serial No. 609,018. Divided and this application July 21, 1933. Serial No. 681,583

8 Claims. (Cl. 180—79.2)

This invention relates to steering mechanism and more particularly to power-operated steering mechanisms adapted for use in connection with vehicles having dirigible wheels.

One of the objects of the present invention is to provide a novel power-operated steering mechanism which is especially adapted for use in connection with motor vehicles.

Another object of the invention is to provide in a motor vehicle steering apparatus a novel construction whereby the operator may readily steer motor vehicles of the larger type, such as trucks or busses, with a minimum amount of effort and at the same time have complete control of the steering of such vehicles as heretofore.

Still another object is to provide a novel power steering mechanism for motor vehicles so constituted as to enable manual control of the steering operation to effect a combined manual and power steering operation.

A further object is to provide in a mechanism of the above character, a novel arrangement of parts whereby manually controlled power operation of the steering apparatus will include a feel or reaction which will be reflected in the manually controlled member in order to simulate as closely as possible the feel or resistance heretofore encountered during manual steering.

A still further object is to provide in a power-operated steering mechanism for motor vehicles, a novel, simple and compact arrangement of parts so constituted as to be relatively light in weight and capable of ready installation without the necessity of completely rebuilding manually-operated steering mechanisms now in common use.

The above and other novel features of the invention will appear more fully hereinafter from the following detailed description when taken in connection with the accompanying drawing, wherein one embodiment of the invention is illustrated. It is to be expressly understood, however, that the drawing is for purposes of illustration only and is not designed as a definition of the limits of the invention, reference being had for this purpose to the appended claims.

In the drawing, wherein similar reference characters denote similar parts throughout the several views:

Fig. 1 is a perspective view of a power steering apparatus constructed in accordance with the present invention;

Fig. 2 is a sectional view of a portion of the mechanism shown in Fig. 1, and

Fig. 3 is a sectional view of one of the controlling valves.

Referring to the drawing, the invention disclosed therein includes a manually-operable steering shaft 40ª having a cam or worm 40 adapted to mesh with a suitable segmental gear member 41 rotatably mounted on the vehicle frame in any suitable manner and securely attached to one end of a lever 42. The other end of the last-mentioned lever is suitably connected to one end of a lever 43 by links 44 and 45, the opposite end of lever 43 being formed with a hub portion 46, Fig. 2, surrounding but spaced from a stub shaft 47 suitably secured to the vehicle frame. As shown, the lever 43 is pivotally mounted intermediate its ends by means of a pivot pin or bolt 48 to a pitman arm or lever 49, one end of which is rotatably mounted upon the stub shaft 47 by means of a bushing 50. As shown in Figs. 1 and 2, the lower end of the pitman arm or lever 49 is secured to a drag link and steering connections of suitable design, it being pointed out that pivotal movement of arm 49 about the stub shaft 47 will effect steering of the dirigible wheels of the vehicle according to the direction of rotation of the cam 40.

Means are provided for operating the arm 49 by power, and preferably such power means are controlled by operation of the steering cam 40. As shown, such power means are constituted by power cylinders 50 and 51 having pistons 52 and 53 respectively, which are interconnected by means of rods 54 and 55, the means for interconnecting such rods comprising a suitable coupling member 57 which is secured to the pitman arm 49 by means of a pin 56. Any suitable fluid under pressure, such as air, is adapted to be conducted to the power cylinders 50 and 51 through ducts 25 and valve mechanisms 58 and 59, such valve mechanisms being provided with operating rods 60 and 61 which are respectively connected with collars 62 and 63 rotatably mounted upon the hub portion 46 of lever 43, Fig. 2.

Referring more particularly to Fig. 3, the valve mechanisms 58 and 59 each includes a casing 28 having intake and exhaust valves 29 and 30 secured together and reciprocatingly mounted therein, there being provided resilient means 31 for normally maintaining the valve 29 upon a seat 32 secured to the casing. The exhaust valve 30, as shown, is normally spaced from its seat 33 formed in the head of a reciprocating piston member 34, this last-named member having a bore 35 formed therein which normally establishes communication between one side of the fluid motor and the atmosphere through 36 associated with the cylinder 20. Preferably, a spring 37 is interposed between the casing 28 and the piston 34 in order to maintain the latter in such a position that the bore 35 will not be closed by the valve 30.

During operation of the above-described form of the invention, considering the cam 40 to be turned in such a direction as to effect a counterclockwise movement of gear segment 41 with respect to its pivotal mounting on the vehicle frame, it will be readily observed that links 44 and 45 will be moved to the right effecting a counterclockwise movement of lever 43 about its pivot 48 which latter, it will be appreciated, momentarily remains stationary, since the same is connected through arm 49 to the dirigible wheels of the vehicle and to the pistons 51 and 52 of the power cylinders. Upon the counterclockwise movement of lever 43, it will be readily observed that the hub portion 46 of said lever, together with collars 62 and 63 rotatably mounted thereon, will be moved to the left, as viewed in Fig. 1, taking up the lost motion existing between hub portion 46 and stub shaft 47, such movement effecting operation of the valve 58 to admit fluid under pressure to power cylinder 50 which will cause rod 54 to move to the right in order to effect power operation of the pitman arm 49. It will also be readily observed that the valve mechanism 58 will be rendered inoperative by counterclockwise movement of lever 49 about the stub shaft 47 by reason of the interconnection between the pitman arm 49 and lever 43 at 48, such connection effecting a movement of hub portion 46 to the right, it being appreciated that the lower end of lever 43 secured to the links 44 and 45 will remain substantially stationary in view of the self-locking nature of the cam 40. It will be understood that continued rotation of the cam 40 will, after the lost motion between hub 46 and the stub shaft 47 has been taken up to operate the selected fluid motor, enable the manual effort of the operator to be added to the power operation of the steering mechanism.

Preferably, the springs 37 of the valve mechanisms are so constructed as to readily yield during the usual operation of the steering mechanism in order to permit the functioning of the power apparatus. However, under certain circumstances it may be desirable to steering the vehicle manually, in the usual manner, and to permit the power apparatus to become operable only when a predetermined resistance to steering is encountered, such as for example, during travel in sandy or muddy roads, such an operation obviously conserving the supply of compressed air required to be carried by the vehicle. In such event it is only necessary to construct the springs 37 in such a manner that they will oppose the tendency of the valve operating rods 60 and 61 to compress them, during operation of the steering mechanism when only slight resistance to steering is encountered, but will yield as soon as a predetermined resistance is reached, thereby permitting operation of the power apparatus.

It will be appreciated from the above that the construction of the parts is such as to enable a feel or resistance to steering to be reflected in the steering shaft 40ª in order to convey to the operator the usual reaction to steering encountered during normal operation of steering gears of the manually-operated type, which reaction is highly desirable in steering mechanisms operated by power. For example, as soon as the lost motion existing between the hub portion 46 of the lever 43 and the stub shaft 47 has been taken up, considering movement of the segment 41 in a clockwise direction, and air under pressure is being conveyed to the power cylinder 53, it will be observed that pressure will be exerted upon the right-hand portion of piston 34 tending to move the latter, together with rod 61 and collar 63, to the left, which in effect tends to rotate the lever 43 in a counterclockwise direction about pivot 48 thus exerting a certain predetermined resistance to the turning of the cam 40 when operated to effect a steering of the dirigible wheels of the vehicle. Thus, substantially simultaneously with the actuation of the steering shaft 40ª by the operator to effect a movement of the upper end of lever 43 to the right, as viewed in Fig. 1, the operation of the valve mechanism will cause a reaction to be exerted which is conveyed to the operator through the steering shaft 40ª. Such an arrangement is extremely advantageous, as will be appreciated, in that the usual resistance or reaction offered to steering may be readily noted by the operator.

There is thus provided by the present invention a power steering mechanism of relatively few parts, so constituted as to be capable of ready installation upon motor vehicles with a minimum amount of rearrangement of the steering apparatus thereon. The provision of the lost motion in the steering operating linkage enables ready actuation of the valves controlling the flow of fluid under pressure to the power actuators and moreover provides a construction whereby the manual effort of the operator may readily supplement the power operation of the steering mechanism. The arrangement of these valves and of the power actuators, as above described, is also of such a nature as to enable a reaction or resistance to be exerted upon the manually-operable steering shaft which is readily noticeable by the operator when rotating such shaft, to the end that the operator may more readily gauge the degree of steering as in steering mechanism of the manually-operable type.

While only one embodiment of the invention has been illustrated and described, it is to be understood that the invention is not limited thereto but may be capable of being employed in other forms as well understood by those skilled in the art. Furthermore, the parts disclosed herein may be rearranged if desired, and certain of the parts may be used without others without departing from the spirit of the invention. Reference will therefore be had to the appended claims for a definition of the limits of the invention.

This application is a division of our application Serial No. 609,018, for Steering mechanism, filed May 3, 1932.

What is claimed is:

1. A motor vehicle power steering mechanism having a manually rotatable cam, a steering lever, a stationary stub shaft, a member operatively connected at one end with said cam and having a lost motion connection at its other end with said shaft, a second member operatively connected at one end with said steering lever and rotatably mounted at its other end on said shaft, means for pivotally connecting each of said members together intermediate the ends thereof, a fluid motor connected with said second member, and means dependent upon pivotal movement of said first named member with respect to said second member to take up said lost motion for controlling the operation of said motor.

2. In combination with a manually-rotatable steering shaft, a steering member, a fluid pressure motor operatively connected with said steering member, valve means for controlling said motor, and means for operatively connecting said shaft and steering member and for controlling said valve means to effect power operation or combined power and manual operation of said steering member comprising a lever operatively connected with said steering member and directly connected with said fluid motor, a valve control lever pivotally mounted intermediate it's ends to said first named lever, one end of said valve control lever being operatively connected with said manually-rotatable steering shaft independently of said first named lever, means for connecting the opposite end of said control lever to said valve means, and means for mounting said last named end to allow limited pivotal movement of the control lever with respect to said first named lever to operate said valve means, one end of the first named lever being fulcrumed on said mounting means.

3. In a power steering mechanism for the dirigible wheels of a motor vehicle, a manually operable steering member, a lever connected with said member and adapted to be oscillated thereby, a power operated steering arm connected to the dirigible wheels of the vehicle, a fluid pressure power means operatively connected with said steering arm, valve means for controlling said power means, and means for controlling said valve means comprising a valve control lever pivotally mounted on said steering arm, a connection between said valve control lever and said first-named lever independent of said pivotal mounting, and a connection between one end of said valve control lever and said valve means.

4. In a motor vehicle power steering mechanism, an oscillatable lever adapted to be manually oscillated in opposite directions for steering, a stationary stub shaft spaced laterally from said lever, a pitman arm having one end thereof journalled on said shaft, a power device connected with said arm adjacent the other end thereof, a control means for said power device including a lever pivotally connected intermediate its ends to said arm, one end of said last-named lever having an opening surrounding but normally spaced from said stub shaft, and means for connecting the other end of said last-named lever and the free end of said oscillatable lever.

5. A motor vehicle power steering mechanism having a manually rotatable steering shaft, a drag link, a stationary stub shaft, a lever operatively connected at one end with said steering shaft and having a lost motion connection at its other end with said stub shaft, a pitman arm operatively connected at one end with said drag link and rotatably mounted at its other end on said stub shaft, means for pivotally connecting said lever and arm together intermediate the ends thereof, a fluid motor having a movable element operatively connected with said arm between the connections thereof with said lever and drag link, and valvular means dependent upon pivotal movement of said lever with respect to said arm to take up said lost motion for controlling the operation of said motor.

6. A motor vehicle power steering mechanism having a manually rotatable shaft, a stationary stub shaft, a steering lever having one end thereof journalled on said stub shaft, power means operatively connected to said steering lever, means for controlling said power means comprising a lever pivotally mounted intermediate the ends thereof on said steering lever and having a hub formed on one end surrounding but normally spaced from said stub shaft, and means for connecting the other end of said lever to said manually rotatable shaft independently of said pivotal mounting.

7. A motor vehicle power steering mechanism having a manually rotatable steering shaft, a drag link, means including a pair of pivotally connected levers for interconnecting said shaft and drag link, a fluid pressure operated power means operatively connected with one of said levers, and a stationary stub shaft for mounting one end of both of said levers, said end of said one lever being rotatably mounted on said stub shaft and said end of the other lever having limited movement with respect to the stub shaft for controlling said power means.

8. In a power steering apparatus for motor vehicles having a manually operable steering shaft, a power operated steering arm, a stationary stub shaft, and a lever pivotally connected to both said steering shaft and said arm at points spaced along the length of said lever, the latter having a lost motion connection with said stub shaft, for controlling the application of power to said power operated steering arm.

WILFRED A. EATON.
STEPHEN VORECH.

DISCLAIMER 1,938,745.—*Wilfred A. Eaton* and *Stephen Vorech*, Pittsburgh, Pa. STEERING MECHANISM. Patent dated December 12, 1933. Disclaimer filed June 22, 1934, by the assignee, *Bendix-Westinghouse Automotive Air Brake Company.*

Hereby enter this disclaimer to claim 3 of the aforesaid Letters Patent which is in the following words, to wit:

In a power steering mechanism for the dirigible wheels of a motor vehicle, a manually operable steering member, a lever connected with said member and adapted to be oscillated thereby, a power operated steering arm connected to the dirigible wheels of the vehicle, a fluid pressure power means operatively connected with said steering arm, valve means for controlling said power means, and means for controlling said valve means comprising a valve control lever pivotally mounted on said steering arm, a connection between said valve control lever and said first-named lever independent of said pivotal mounting, and a connection between one end of said valve control lever and said valve means.

[*Official Gazette July 24, 1934.*]

motion for controlling the operation of said motor.

2. In combination with a manually-rotatable steering shaft, a steering member, a fluid pressure motor operatively connected with said steering member, valve means for controlling said motor, and means for operatively connecting said shaft and steering member and for controlling said valve means to effect power operation or combined power and manual operation of said steering member comprising a lever operatively connected with said steering member and directly connected with said fluid motor, a valve control lever pivotally mounted intermediate i's ends to said first named lever, one end of said valve control lever being operatively connected with said manually-rotatable steering shaft independently of said first named lever, means for connecting the opposite end of said control lever to said valve means, and means for mounting said last named end to allow limited pivotal movement of the control lever with respect to said first named lever to operate said valve means, one end of the first named lever being fulcrumed on said mounting means.

3. In a power steering mechanism for the dirigible wheels of a motor vehicle, a manually operable steering member, a lever connected with said member and adapted to be oscillated thereby, a power operated steering arm connected to the dirigible wheels of the vehicle, a fluid pressure power means operatively connected with said steering arm, valve means for controlling said power means, and means for controlling said valve means comprising a valve control lever pivotally mounted on said steering arm, a connection between said valve control lever and said first-named lever independent of said pivotal mounting, and a connection between one end of said valve control lever and said valve means.

4. In a motor vehicle power steering mechanism, an oscillatable lever adapted to be manually oscillated in opposite directions for steering, a stationary stub shaft spaced laterally from said lever, a pitman arm having one end thereof journalled on said shaft, a power device connected with said arm adjacent the other end thereof, a control means for said power device including a lever pivotally connected intermediate its ends to said arm, one end of said last-named lever having an opening surrounding but normally spaced from said stub shaft, and means for connecting the other end of said last-named lever and the free end of said oscillatable lever.

5. A motor vehicle power steering mechanism having a manually rotatable steering shaft, a drag link, a stationary stub shaft, a lever operatively connected at one end with said steering shaft and having a lost motion connection at its other end with said stub shaft, a pitman arm operatively connected at one end with said drag link and rotatably mounted at its other end on said stub shaft, means for pivotally connecting said lever and arm together intermediate the ends thereof, a fluid motor having a movable element operatively connected with said arm between the connections thereof with said lever and drag link, and valvular means dependent upon pivotal movement of said lever with respect to said arm to take up said lost motion for controlling the operation of said motor.

6. A motor vehicle power steering mechanism having a manually rotatable shaft, a stationary stub shaft, a steering lever having one end thereof journalled on said stub shaft, power means operatively connected to said steering lever, means for controlling said power means comprising a lever pivotally mounted intermediate the ends thereof on said steering lever and having a hub formed on one end surrounding but normally spaced from said stub shaft, and means for connecting the other end of said lever to said manually rotatable shaft independently of said pivotal mounting.

7. A motor vehicle power steering mechanism having a manually rotatable steering shaft, a drag link, means including a pair of pivotally connected levers for interconnecting said shaft and drag link, a fluid pressure operated power means operatively connected with one of said levers, and a stationary stub shaft for mounting one end of both of said levers, said end of said one lever being rotatably mounted on said stub shaft and said end of the other lever having limited movement with respect to the stub shaft for controlling said power means.

8. In a power steering apparatus for motor vehicles having a manually operable steering shaft, a power operated steering arm, a stationary stub shaft, and a lever pivotally connected to both said steering shaft and said arm at points spaced along the length of said lever, the latter having a lost motion connection with said stub shaft, for controlling the application of power to said power operated steering arm.

WILFRED A. EATON.
STEPHEN VORECH.

DISCLAIMER 1,938,745.—*Wilfred A. Eaton* and *Stephen Vorech*, Pittsburgh, Pa. STEERING MECHANISM. Patent dated December 12, 1933. Disclaimer filed June 22, 1934, by the assignee, *Bendix-Westinghouse Automotive Air Brake Company*.

Hereby enter this disclaimer to claim 3 of the aforesaid Letters Patent which is in the following words, to wit:

In a power steering mechanism for the dirigible wheels of a motor vehicle, a manually operable steering member, a lever connected with said member and adapted to be oscillated thereby, a power operated steering arm connected to the dirigible wheels of the vehicle, a fluid pressure power means operatively connected with said steering arm, valve means for controlling said power means, and means for controlling said valve means comprising a valve control lever pivotally mounted on said steering arm, a connection between said valve control lever and said first-named lever independent of said pivotal mounting, and a connection between one end of said valve control lever and said valve means.

[*Official Gazette July 24, 1934.*]